(12) United States Patent
Jeon et al.

(10) Patent No.: US 12,548,774 B2
(45) Date of Patent: Feb. 10, 2026

(54) ELECTRODE FOR BATTERY, AND SECONDARY BATTERY INCLUDING SAME

(71) Applicant: SK On Co., Ltd., Seoul (KR)

(72) Inventors: Chan Young Jeon, Daejeon (KR); Hee Gyoung Kang, Daejeon (KR); So Hyun Park, Daejeon (KR); Hae Suk Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 826 days.

(21) Appl. No.: 17/855,978

(22) Filed: Jul. 1, 2022

(65) Prior Publication Data

US 2023/0012523 A1    Jan. 19, 2023

(30) Foreign Application Priority Data

Jul. 2, 2021 (KR) .................. 10-2021-0087021

(51) Int. Cl.
*H01M 4/583* (2010.01)
*H01M 10/0525* (2010.01)
*H01M 4/02* (2006.01)

(52) U.S. Cl.
CPC ....... *H01M 4/583* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2019/0058192 A1 | 2/2019 | Tsuchiya et al. | |
| 2021/0273223 A1* | 9/2021 | Piao ...................... | H01M 4/133 |

FOREIGN PATENT DOCUMENTS

| | | |
|---|---|---|
| JP | 2014132555 A | 7/2014 |
| JP | 2017183236 A | 10/2017 |
| KR | 101927294 B1 | 12/2018 |
| KR | 1020190066867 A | 6/2019 |
| WO | 2020159322 A1 | 8/2020 |

* cited by examiner

*Primary Examiner* — Wyatt P McConnell
(74) *Attorney, Agent, or Firm* — The Webb Law Firm

(57) ABSTRACT

The present invention provides an electrode for a secondary battery that includes a current collector and an electrode active material layer that is formed on the current collector and contains an electrode active material, and satisfies Relational Expression 1, 7≤total surface area of active material particles per unit volume of electrode active material layer≤10 and Relational Expression 2, 20≤total surface area of effective pores per unit volume of electrode active material layer≤29.

11 Claims, 2 Drawing Sheets

[FIG. 1A]
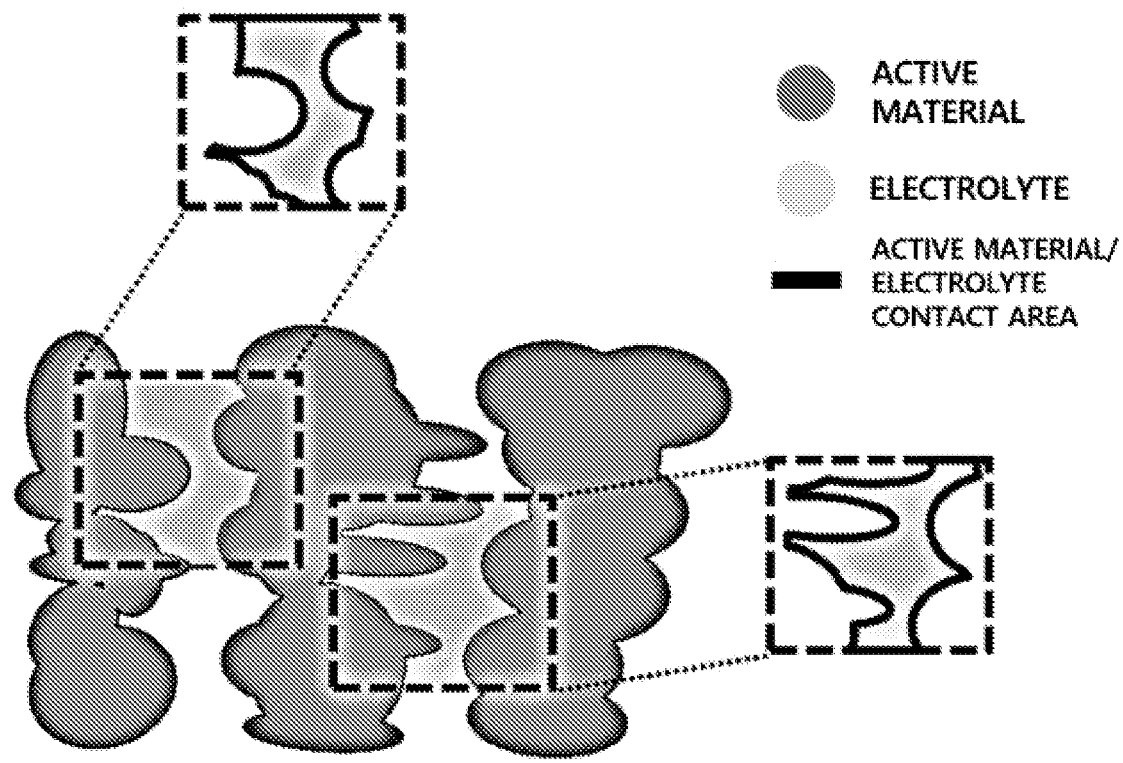

[FIG. 1B]
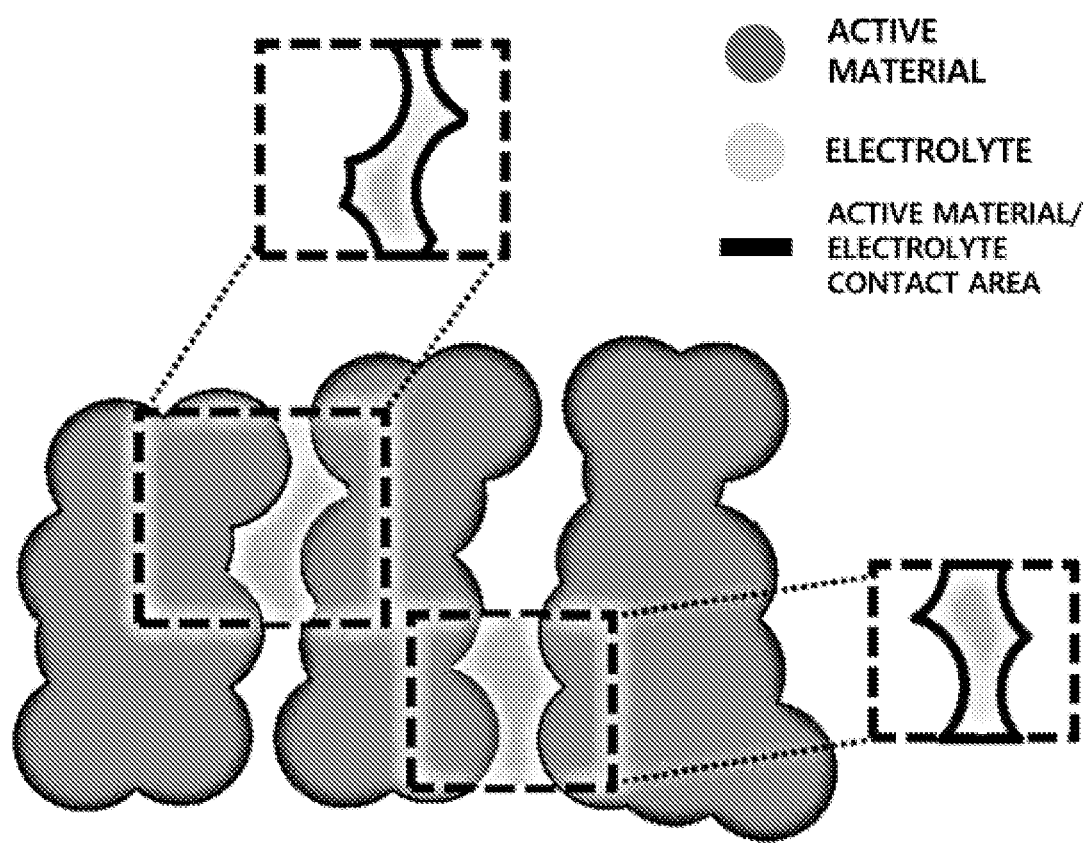

ELECTRODE FOR BATTERY, AND SECONDARY BATTERY INCLUDING SAME

CROSS-REFERENCE TO RELATED APPLICATION

This application claims priority to Korean Patent Application No. 10-2021-0087021, filed on Jul. 2, 2021, the disclosure of which is hereby incorporated by reference in its entirety.

BACKGROUND OF THE INVENTION

Field of the Invention

The following disclosure relates to an electrode for a secondary battery having improved fast charging performance and a secondary battery including the same.

Description of Related Art

Recently, as the demand for electronic devices such as mobile devices increases, the development of weight reduction and miniaturization of electrochemical batteries (secondary batteries) to increase portability of the electronic devices is expanding. According to this trend, as regulations related to automobile fuel efficiency and exhaust gas are being strengthened worldwide, the growth of the electric vehicle (EV) market is accelerating. Accordingly, the development of a high-output, large-capacity lithium secondary battery for use in such electric vehicles is required.

As the importance of developing pores in an electrode has been revealed for high performance of lithium secondary batteries, studies are being conducted to develop a pore structure of an electrode that is advantageous in expressing high performance. Specifically, the diffusion of lithium ions in the electrode may be improved by controlling factors such as the volume of pores in the electrode and the size of the pores. However, when the pores are not uniformly formed in the electrode, it is difficult to achieve the purpose of improving the performance of the lithium secondary battery.

Accordingly, there is a need to develop an electrode for a secondary battery to achieve high performance of a lithium secondary battery by reducing a difference in the amount of reaction according to an electrode position through a uniform pore distribution in the electrode and suppressing a polarization phenomenon caused by current non-uniformity.

SUMMARY OF THE INVENTION

An embodiment of the present invention is directed to an electrode for a secondary battery having a pore structure that is advantageous in expressing high performance, and in particular, having excellent high-rate charge/discharge performance by securing uniformity of a pore distribution in the electrode for the secondary battery to reduce a polarization phenomenon in the electrode as well as improve diffusion performance of lithium ions.

In one general aspect, an electrode for a secondary battery includes a current collector, and
an electrode active material layer that is formed on the current collector and contains an electrode active material, and
satisfies the following Relational Expressions 1 and 2.

$7 \leq$ total surface area of active material particles per unit volume of electrode active material layer $\leq 10$  [Relational Expression 1]

$20 \leq$ total surface area of effective pores per unit volume of electrode active material layer $\leq 29$  [Relational Expression 2]

(In the above Relational Expression 1, the total surface area (m²/cc) of the active material particles per unit volume of the electrode active material layer is defined as a surface area A (m²/g) of the electrode active material layer*density D (g/cc) of the electrode, and in the above Relational Expression 2, the total surface area (m²/ml) of effective pores per unit volume of the electrode active material layer is defined as the surface area A (m²/g) of the electrode active material layer/effective pore volume $V_P$ (ml/g) in the electrode active material layer.)

The surface area A of the electrode active material layer may be 4 to 6 m²/g.
The density D of the electrode may be 1.6 to 1.8 g/cc.
The effective pore volume $V_P$ in the electrode active material layer may be 0.15 to 0.25 ml/g.

The electrode for a secondary battery may further satisfy the following Relational Expressions 3 and 4.

$7.3 \leq$ total surface area of active material particles per unit volume of electrode active material layer $\leq 9.5$  [Relational Expression 3]

$20.5 \leq$ total surface area of effective pores per unit volume of electrode active material layer $\leq 28.5$  [Relational Expression 4]

(In the above Relational Expression 3, the total surface area (m²/cc) of the active material particles per unit volume of the electrode active material layer is defined as a surface area A (m²/g) of the electrode active material layer*density D (g/cc) of the electrode, and in the above Relational Expression 4, the total surface area (m²/ml) of effective pores per unit volume of the electrode active material layer is defined as the surface area A (m²/g) of the electrode active material layer/effective pore volume $V_P$ (ml/g) in the electrode active material layer.)

The electrode for a secondary battery may satisfy at least two of the following Relational Expressions 5 to 7

$4.4 \leq A \leq 5.6$  [Relational Expression 5]

$0.18 \leq V_P \leq 0.21$  [Relational Expression 6]

$1.68 \leq D \leq 1.75$  [Relational Expression 7]

(In the Relational Equation 5, A is the surface area (m²/g) of the electrode active material layer, $V_p$ is the effective pore volume (ml/g) in the electrode active material layer, and D is the density (g/cc) of the electrode.)

A ratio ((D90−D10)/D50) of a difference between a D90 particle diameter and a D10 particle diameter to a D50 particle diameter of the active material particles in the electrode active material layer may be 1 or less.

An average size of the effective pores in the electrode active material layer may be 10 μm or less.

The electrode may be an anode.

The electrode active material may include a carbon-based active material.

In another aspect, there is provided a secondary battery including the electrode according to the embodiment of the present invention, a separator, and an electrolyte.

BRIEF DESCRIPTION OF DRAWINGS

FIGS. 1A and 1B are diagrams illustrating an internal structure of an electrode according to whether to reflect uniformity of a pore distribution in the electrode. FIG. 1A is a diagram illustrating the internal structure of the electrode when the uniformity of the pore distribution in the electrode is not reflected, and FIG. 1B is a diagram illustrating the internal structure of the electrode when the uniformity of the pore distribution is not reflected.

DESCRIPTION OF THE INVENTION

Various advantages and features of the present invention and methods accomplishing them will become apparent from the following description of embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Hereinafter, exemplary embodiments of the present invention will be described in detail with reference to the accompanying drawings. Like reference numbers refer to like elements irrespective of the drawings, and "and/or" includes each and every combination of one or more of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

Throughout the present specification, it will be understood that when an element such as a layer, a film, a region, or a substrate is referred to as being "on" or "over" another element, it may be directly on another element or may have an intervening element present therebetween.

An embodiment of the present invention provides an electrode for a secondary battery. The electrode includes a current collector, and an electrode active material layer that is formed on the current collector and contains an electrode active material, and satisfies the following Relational Expressions 1 and 2.

7≤total surface area of active material particles per unit volume of electrode active material layer≤10      [Relational Expression 1]

20≤total surface area of effective pores per unit volume of electrode active material layer≤29      [Relational Expression 2]

(In the above Relational Expression 1, the total surface area (m²/cc) of the active material particles per unit volume of the electrode active material layer is defined as a surface area A (m²/g) of the electrode active material layer*density D (g/cc) of the electrode, and in the above Relational Expression 2, the total surface area (m²/ml) of effective pores per unit volume of the electrode active material layer is defined as the surface area A (m²/g) of the electrode active material layer/effective pore volume $V_P$ (ml/g) in the electrode active material layer.)

In the above Relational Expression 1, the total surface area (m²/cc) of the active material particles per unit volume of the electrode active material layer is defined as the surface area A (m²/g) of the electrode active material layer*the density D (g/cc) of the electrode.

Specifically, the surface area A of the electrode active material layer may refer to the total surface area of the active material in the electrode active material layer, and may be measured using a mercury intrusion method. In terms of providing a sufficient reaction site in the electrode, the surface area A of the electrode active material layer may be 4 to 6 m²/g, preferably 4.2 to 5.8 m²/g.

The density D of the electrode refers a the mixing density of the electrode after rolling, and in terms of increasing the energy density by increasing the content of the active material in the same electrode volume, the density D of the electrode may have 1.6 to 1.8 g/cc, preferably 1.65 to 1.8 g/cc, and for example, may have 1.7 g/cc.

In the above Relational Expression 2, the total surface area (m²/ml) of effective pores per unit volume of the electrode active material layer is defined as the surface area A (m²/g) of the electrode active material layer/effective pore volume $V_P$ (ml/g) in the electrode active material layer.

The surface area A of the electrode active material layer is the same as described above.

The effective pore volume $V_P$ in the electrode active material layer refers to the content of effective pores present in the electrode active material layer, and may be specifically measured using a mercury intrusion method. In this case, the effective pores refer to open-end pores having an average pore size of 10 m or less, specifically 10 nm to 10 μm, and are distinguished from pores formed by cracking or peeling of the electrode.

The effective pore volume $V_p$ in the electrode active material layer may be 0.15 to 0.25 ml/g, and preferably 0.16 to 0.24 ml/g. In the above range, "effective pores", which are pores that substantially contribute to ion conduction, may be sufficiently provided, thereby providing a smooth ion diffusion path in the electrode.

The total surface area of active material particles and the total surface area of effective pores per unit volume of the electrode active material layer according to the present invention reflect the uniformity of the pore distribution in the electrode, and thus, it is possible to provide information related to the pore structure in the electrode with high accuracy compared to the electrode pore structure control using the size, porosity, or the like of the pores in the electrode according to the related art. On the other hand, since the information on the uniformity of the pore distribution in the electrode may not be provided through factors such as the size and the porosity of pores in the electrode according to the related art, it may be difficult to accurately evaluate the performance of the secondary battery. Furthermore, estimating the performance without interpretation of the uniformity of the pore distribution in the electrode may provide erroneous information, which may lead to misunderstanding.

Specifically, FIG. 1A is a diagram illustrating the internal structure of the electrode when the uniformity of the pore distribution in the electrode is not reflected. As a non-limiting example, as illustrated in FIG. 1A, when the pores in the electrode are non-uniformly formed in a leaf shape, the contact area of the active material/electrolyte per unit volume of the electrode active material layer may be different depending on the position of the electrode. The contact area of the active material/electrolyte solution is directly related to the amount of reaction sites where an electrochemical reaction occurs substantially during the charging/discharging process, and as the contact area increases, the reaction efficiency also increases. However, when the uniformity of the pore distribution in the electrode is reduced, and thus, the contact area of the active material/ electrolyte per unit volume of the electrode active material layer is different depending on the position of the electrode, non-uniform current distribution in the electrode is caused, and in particular, severe polarization may occur under high-rate charge/discharge conditions, thereby degrading the performance. Meanwhile, the pores in the electrode serve as passages for the electrolyte, and the electrolyte may refer to the electrolyte in the pores.

On the other hand, the electrode for a secondary battery that simultaneously satisfies the above Relational Expressions 1 and 2 improves the uniformity of the pore distribution in the electrode, so the contact area between the electrolyte and the active material particles may exhibit a similar value regardless of the position of the electrode.

Specifically, as illustrated in FIG. 1B, when the pore structure in the electrode is uniform, it is possible to provide an optimal structure for the uniform current distribution in the electrode by having the contact area of the active material/electrolyte per unit volume of a similar electrode active material layer no matter which point in the electrode is selected. Accordingly, the excellent performance may be expressed by reducing the polarization phenomenon in the electrode even under the high-rate charge/discharge conditions.

The electrode may satisfy the above Relational Expressions 1 and 2, and more preferably, further satisfy the following Relational Expressions 3 and 4.

$7.3 \leq$ total surface area of active material particles per unit volume of electrode active material layer $\leq 9.5$  [Relational Expression 3]

$20.5 \leq$ total surface area of effective pores per unit volume of electrode active material layer $\leq 28.5$  [Relational Expression 4]

(In the above Relational Expression 3, the total surface area (m²/cc) of the active material particles per unit volume of the electrode active material layer is defined as the surface area A (m²/g) of the electrode active material layer*the density D (g/cc) of the electrode, and in the Relational Expression 4, the total surface area (m²/ml) of the effective pores per unit volume of the electrode active material layer is defined as the surface area A (m²/g) of the electrode active material layer/effective pore volume $V_P$ (ml/g) in the electrode active material layer.)

Under the conditions that simultaneously satisfy Relational Expressions 3 and 4, it is possible to provide sufficient effective pores in the electrode and increase the uniformity of the pore distribution. Accordingly, it is possible to maximize the amount of reaction sites present per unit volume in the electrode, and to enable the uniform distribution of the reaction sites. In this case, the reaction site may refer to the contact area of the active material particles in the electrode and the electrolyte in the pores formed in the electrode, and the uniform distribution of the reaction sites may mean that the contact area of the active material/electrolyte per unit volume of the electrode active material layer is wide, and the contact area is similar regardless of the position of the electrode.

The electrode may satisfy at least two or more of the following Relational Expressions 5 to 7.

$4.4 \leq A \leq 5.6$  [Relational Expression 5]

$0.18 \leq V_P \leq 0.21$  [Relational Expression 6]

$1.68 \leq D \leq 1.75$  [Relational Expression 7]

(In the above Relational Expression 5, A is the surface area (m²/g) of the electrode active material layer, $V_p$ is the effective pore volume (ml/g) in the electrode active material layer, and D is the electrode density (g/cc).)

The electrode for a secondary battery according to the embodiment of the present invention may simultaneously satisfy at least two or more of Relational Expressions 5 to 7, to exhibit the uniform pore structure in the electrode, and in particular, provide the uniform lithium ion diffusion path even under the high-rate charging conditions, thereby remarkably improving the high-output characteristics.

In the active material layer of the electrode for a secondary battery according to the embodiment of the present invention, Dspan, which is a ratio ((D90−D10)/D50) of a difference between a D90 particle diameter and a D10 particle diameter to a D50 particle diameter of the active material particles is 0.9 or less, preferably 0.7 to 0.9, and more preferably 0.75 to 0.89. In the above range, it is possible to reduce a particle size deviation of the active material particles in the electrode active material layer to implement an electrode active material layer including uniform active material particles, and furthermore, form uniform pores in the electrode active material layer.

The D10, D50, and D90 refer to particle diameters from a small particle diameter to cumulative volumes of 10%, 50%, and 90%, respectively, in particle size distribution measurement by the laser scattering method. Specifically, it is possible to obtain by taking a sample according to the KS A ISO 13320-1 standard for electrode active material particles and measuring the particle size distribution using Mastersizer3000 of Malvern. For example, after ethanol used as a solvent is dispersed by an ultrasonic disperser if necessary, a volume density may be measured, but the present invention is not limited thereto.

The electrode may include a current collector and an electrode active material layer formed by applying electrode slurry containing an electrode active material to at least one surface of the current collector.

The electrode active material may be used without limitation as long as it is an electrode active material commonly used in secondary batteries. In the case of a cathode active material, a known cathode active material in the art may be used. For example, a composite oxide of lithium and a metal selected from cobalt, manganese, nickel, and combinations thereof may be used, but is not limited thereto.

When the electrode active material is an anode active material, the electrode active material may include at least one type of carbon-based active material, and preferably include at least two or more types of carbon-based active material. For example, the anode active material may be at least one type of carbon-based active material, and more preferably, at least two or more types of carbon-based active material. The carbon-based active material may include at least one selected from the group consisting of natural graphite, artificial graphite, graphitized carbon fiber, graphitized mesocarbon microbeads, and amorphous carbon.

The anode active material may further include a metal-based active material, and the metal-based anode active material is an active material containing a metal. Generally, the anode active material refers to an active material that contains an element that has lithium inserted into its structure and has a theoretical electric capacity of 500 mAh/g or more per unit mass when lithium is inserted. As the metal-based active material, for example, lithium metal, a single metal (e.g., Ag, Al, Ba, Bi, Cu, Ga, Ge, In, Ni, P, Pb, Sb, Si, Sn, Sr, Zn, Ti, etc.) capable of forming a lithium alloy and alloys thereof, and oxides, sulfides, nitrides, silicides, carbides, phosphides, and the like thereof are used.

Among the metal-based anode electrode active materials, an active material containing silicon is preferable. By using the silicon-based anode electrode active material, the lithium ion secondary battery may have a high capacity. Examples of the silicon-based anode electrode active material may include silicon (Si), an alloy of silicon and cobalt, nickel, iron, etc., SiOx ($0<x<2$), a mixture of Si-containing material and carbon material, a composite of Si-containing material and conductive carbon formed by coating or complexing Si-containing material with conductive carbon, and the like.

The electrode active material layer may include an electrode active material, and optionally further include a binder and a conductive material.

The binder may be a water-soluble binder. Specifically, the binder may include styrene-butadiene rubber, acrylated styrene-butadiene rubber, polyvinyl alcohol, sodium polyacrylate, a copolymer of propylene and olefin having 2 to 8 carbon atoms, polyacrylamide, a copolymer of (meth)acrylic acid and (meth)acrylic acid alkyl ester, or a combination thereof.

When using the water-soluble binder, the water-soluble binder may bind the electrode active material well to the current collector without affecting viscosity of slurry, but as the slurry may be easily gelled due to the electrode active material and the conductive material which are fine particles, may further include a thickener for imparting viscosity to the slurry to prepare stable slurry. For example, as the thickener, a mixture of one or more of a cellulose-based compound, specifically, carboxymethyl cellulose, hydroxypropylmethyl cellulose, methyl cellulose, alkali metal salts thereof, or the like may be used. As the alkali metal, Na, K, or Li can be used.

The conductive material is used to impart conductivity to the anode, and is not particularly limited as long as it is a conventional electronically conductive material that does not cause chemical change in the battery. An example of the conductive material may include natural graphite, artificial graphite, carbon black, acetylene black, ketjen black, carbon fiber, carbon nanotube, and combinations thereof, but is not limited thereto.

As the current collector, one selected from the group consisting of copper foil, nickel foil, stainless steel foil, titanium foil, nickel foam, copper foam, a polymer substrate coated with conductive metal, and a combination thereof may be used, but is not limited thereto.

The electrode for a secondary battery according to the embodiment of the present invention may be an anode. Specifically, since the anode for a secondary battery satisfies the above-described conditions, it is possible to secure the uniformity of the pore distribution in the anode and reduce the polarization in the anode to improve the uniformity of the energy density in the electrode, thereby remarkably improving the high-output performance.

The electrode of the present invention provides a secondary battery including the electrode, a separator, and an electrolyte.

The electrode is the same as described above.

The separator may be, for example, selected from glass fiber, polyester, polyethylene, polypropylene, polytetrafluoroethylene, or a combination thereof, and may be in the form of a nonwoven fabric or a woven fabric. For example, a polyolefin-based polymer separator such as polyethylene or polypropylene may be mainly used for a lithium secondary battery, and a separator coated with a composition containing a ceramic component or a polymer material may be used to secure heat resistance or mechanical strength, and may be used optionally in a single-layer or multi-layer structure. The separator known in the art may be used, but the present invention is not limited thereto.

The electrolyte contains an organic solvent and a lithium salt.

The organic solvent serves as a medium through which ions involved in the electrochemical reaction of the battery may move. As the organic solvent, for example, a carbonate-based, ester-based, ether-based, ketone-based, alcohol-based, or aprotic solvent may be used. The organic solvent may be used alone or in a mixture of two or more. When the organic solvent of a mixture of two or more is used, a mixing ratio may be appropriately adjusted according to the desired battery performance. On the other hand, the organic solvent known in the art may be used, but the present invention is not limited thereto.

The lithium salt is a material that is dissolved in an organic solvent, acts as a source of lithium ions in the battery, enables an operation of a basic lithium secondary battery, and promotes movement of lithium ions between the cathode and the anode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural number), LiCl, LiI, $LiB(C_2O_4)_2$, or a combination thereof, but the present invention is not limited thereto.

The concentration of the lithium salt may be used within the range of 0.1M to 2.0M. When the concentration of the lithium salt is within the above range, since the electrolyte has appropriate conductivity and viscosity, excellent electrolyte performance may be exhibited, and lithium ions may move effectively.

In addition, the electrolyte may further include pyridine, triethyl phosphate, triethanolamine, cyclic ether, ethylene diamine, n-glyme, hexaphosphoric acid triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, or the like to improve charging/discharging characteristics, flame retardant characteristics, and the like, if necessary. In some cases, the electrolyte may further contain halogen-containing solvents such as carbon tetrachloride and ethylene trifluoride to impart incombustibility, and may further include fluoro-ethylene carbonate (FEC), propene sulfone (PRS), fluoro-propylene carbonate (FPC), and the like to improve the high temperature storage properties.

The secondary battery may be a lithium secondary battery.

According to a method of manufacturing a secondary battery according to the present invention for achieving the above object, the secondary battery may be manufactured by sequentially stacking a manufactured anode, a separator, and a cathode to form an electrode assembly, putting the manufactured electrode assembly in a cylindrical battery case or a prismatic battery case, and then injecting an electrolyte. Alternatively, the secondary battery may be manufactured by putting a resultant product obtained by stacking the electrode assembly and then impregnating the electrode assembly into the electrolyte in the battery case, and sealing the battery case.

For the battery case used in the present invention, those commonly used in the field may be adopted, and there is no limitation in the appearance according to the use of the battery, for example, a cylindrical shape using a can, a square shape, a pouch type, or a coin type, etc.

The secondary battery according to the present invention may be used not only in a battery cell used as a power supply for a small device, but also may be preferably used as a unit cell in a medium or large battery module including a plurality of battery cells. Preferred examples of the medium-large device include, but are not limited to, an electric vehicle, a hybrid electric vehicle, a plug-in hybrid electric vehicle, a system for power storage, and the like.

Hereinafter, the present invention will be described in detail with reference to Examples, but these are for describing the present invention in more detail, and the scope of the present invention is not limited to the Examples below.

EXAMPLES

Examples 1 to 5 and Comparative Examples 1 to 5

1: Manufacturing of Anode

Active materials having Dspan values shown in Table 1 were prepared using one or two types of graphite-based active materials. Anode slurry was prepared by adding water to 93.4 wt % of the prepared active material, 3.0 wt % of a carbon black conductive agent, 2.4 wt % of an SBR binder, and 1.2% of CMC, and then mixing at room temperature for 120 minutes The prepared anode slurry was applied to a Cu foil current collector and dried, and then rolled so that an anode mixture density is 1.7 g/cc, thereby preparing an anode.

The Dspan value means a ratio ((D90−D10)/D50) of a difference between a D90 particle diameter and a D10 particle diameter to a D50 particle diameter, and may be obtained by taking a sample according to KS A ISO 13320-1 standard for the active material and measuring the particle size distribution using Mastersizer3000 of Malvern. Specifically, particle diameters from a small particle diameter to cumulative volumes of 10%, 50%, and 90%, respectively, in the particle size distribution measurement were set to be D10, D50, and D90, respectively, and the ratio ((D90−D10)/D50) of the difference between the D90 particle size and the D10 particle size for the D50 particle size was calculated and shown in Table 1 below.

2. Manufacturing of Half-Battery

After interposing a PE separator between the manufactured anode and lithium metal cathode, electrolyte was injected to produce a CR2016 coin cell. A half-battery was manufactured by resting the assembled coin cell at room temperature for 24 hours. In this case, as the electrolyte, an electrolyte in which a lithium salt 1.0M $LiPF_6$ was mixed with an organic solvent (EC:EMC=1:4 Vol %), and 1 volume % of the electrolyte additive FEC was mixed was used.

3. Physical Property Evaluation

1) Measurement of Surface Area A ($m^2$/g) of Anode Active Material Layer

For the anodes manufactured in Examples 1 to 5 and Comparative Examples 1 to 5, the surface area A ($m^2$/g) of the anode active material layer was measured using a mercury intrusion method. Specifically, after the manufactured anode was placed in a cylinder of Mercury Porosimetry (AutoPore IV 9505 of Micromeritics) and the cylinder is filled with mercury, the change in applied pressure was measured while gradually pressurizing the cylinder. Next, the surface area A ($m^2$/g) of the anode active material layer was calculated using Equation 1 below and shown in Table 1 below.

$$A = K_2 \int_0^{V_{max}} P dv \quad \text{[Equation 1]}$$

(In Equation 1, A is a surface area ($m^2$/g) of the anode active material layer, P is an applied pressure (psi), V is a volume (ml) of mercury penetrating into the anode active material layer, and Vmax is a cumulative penetration volume (ml) at a maximum pressure $K_2$ is represented as $-\gamma \cos \theta$, $\gamma$ is a surface tension (dynes/cm) of mercury, and $\theta$ is a contact angle (°) between active material particles in the anode active material layer and the mercury. In this case, the surface tension $\tau$ is 485 dynes/cm, and the contact angle $\theta$ is 130°.)

2) Measurement of Effective Pore Volume $V_p$ (ml/g) in Anode Active Material Layer For the anodes manufactured in Examples 1 to 5 and Comparative Examples 1 to 5, the total pore volume (ml/g) in the anode active material layer was confirmed by the same mercury intrusion method as the above-described method for measuring the surface area A of the anode active material layer. In this case, the pore volume $V_p$ of pores having an average pore size of 10 nm or more and 10 μm or less, that is, effective pores, was calculated and shown in Table 1 below.

3) Evaluation of High-Rate Charging Characteristics of Half Battery

The half batteries manufactured in Examples 1 to 5 and Comparative Examples 1 to 5 were charged and discharged at a low rate (0.1 C) for the initial 3 to 5 cycles to stabilize the electrodes, and then charged at a high rate (2C) to evaluate the high rate charging performance, and the evaluation results were shown in Table 1 below. In this case, the high-rate charging efficiency (%) was calculated by measuring the high-rate charging amount compared to the low-rate charging amount.

EVALUATION EXAMPLES

[Evaluation Example 1]: Comparison of High-Rate Charging Characteristics of Secondary Battery According to Whether Relational Expression 1 is Satisfied For the anodes and half batteries prepared in Examples 1 to 5 and Comparative Examples 1 to 5, the results of physical properties evaluation and charging efficiency (%) of the anode were shown in Table 1 below.

TABLE 1

| | Dspan (D90−D10)/D50 | D (g/cc) | A ($m^2$/g) | $V_P$ (Mℓ/g) | A * D ($m^2$/cc) | A/$V_P$ ($m^2$/Mℓ) | 2C high-rate charging efficiency (%) |
|---|---|---|---|---|---|---|---|
| Example 1 | 0.80 | 1.7 | 4.4 | 0.21 | 7.4 | 20.9 | 91.0 |
| Example 2 | 0.77 | 1.7 | 5.6 | 0.21 | 9.5 | 26.6 | 90.0 |
| Example 3 | 0.89 | 1.7 | 5.0 | 0.18 | 8.5 | 27.7 | 90.0 |
| Example 4 | 0.87 | 1.7 | 5.7 | 0.27 | 9.6 | 21.1 | 89.7 |
| Example 5 | 0.83 | 1.6 | 4.6 | 0.23 | 7.4 | 20 | 89.5 |
| Comparative Example 1 | 0.90 | 1.7 | 4.3 | 0.23 | 7.3 | 18.6 | 89.0 |
| Comparative Example 2 | 0.95 | 1.7 | 4.2 | 0.24 | 7.1 | 17.5 | 85.0 |
| Comparative Example 3 | 0.91 | 1.7 | 4.2 | 0.23 | 7.1 | 18.2 | 88.0 |
| Comparative Example 4 | 0.97 | 1.7 | 4.0 | 0.25 | 6.8 | 16.0 | 87.0 |
| Comparative Example 5 | 0.86 | 1.7 | 3.3 | 0.21 | 5.6 | 15.7 | 73.4 |

In Table 1, an A*D value refers to the total surface area (m²/cc) of the anode active material particles per unit volume of the anode active material layer, and an A/$V_p$ value refers to the total surface area (m²/ml) of effective pores per unit volume of the anode active material layer.

Referring to Table 1, Examples 1 to 4 and Comparative Examples 1 to 5 all used an anode active material having a Dspan value of 1 or less, and all of the manufactured anodes had a mixture density of 1.7 g/cc, but it was analyzed that the high-rate charging characteristics of the half batteries of each Example and Comparative Example are different because the uniformity of the pore distribution in the electrode is different. These results suggest that the uniformity of the pore distribution within the electrode should be considered as an important factor in order to improve the high-rate charging performance.

Specifically, as Examples 1 to 5 satisfying Relational Expressions 1 and 2 of the present invention secure the uniformity of the pore distribution compared to Comparative Examples 1 to 5, there is an effect of improving the uniformity of energy density within the electrode and reduction of polarization within the electrode as well as the diffusion performance of lithium ions, which is analyzed to appear as the high-rate characteristic and other additional electrochemical performance improvement.

Therefore, it could be confirmed that the preferred Dspan value range of the anode active material particles is 0.75 to 0.89.

In the case of Comparative Example 5, the anode active material having the preferred Dspan value of the present invention was used, but it is determined that the high rate characteristics were significantly reduced because the surface area A value of the anode active material layer was too low.

Meanwhile, it could be confirmed that the A*D values and A/$V_P$ values of Examples 1 to 3 simultaneously satisfy the preferred numerical ranges (7.3 to 9.5 m²/cc and 20.5 to 28.5) of the present invention, and thus, were further improved in the above-described effects compared to Examples 4 to 5.

In addition, in the case of Examples 1 to 3 simultaneously satisfying the conditions that the surface area A of the anode active material layer A is 4.4 to 5.6 m²/g, the effective pore volume $V_p$ in the anode active material layer is 0.18 to 0.21 ml/g, and the mixture density of the anode D is 1.68 to 1.75 g/cc, it showed the uniform pore structure in the anode, and remarkable effect may be confirmed from the high-rate charging performance results. It is determined from these results that, due to the uniform pore structure in the anode, it is possible to provide a smooth lithium ion diffusion path even under high-rate charging conditions, thereby remarkably improving the high-output characteristics.

On the other hand, in the case of Examples 4 and 5, the energy density is expected to be relatively reduced compared to Examples 1 to 3 because the volume of pores in the anode is relatively large or the mixture density is relatively low.

According to an electrode for a secondary battery according to the present invention, it is possible to secure a uniform pore structure in the electrode, thereby enabling smooth diffusion of lithium ions in the electrode and improving high output characteristics of the secondary battery.

In addition, it is possible to improve uniformity of an energy density in an electrode, thereby remarkably improving lifespan characteristics of a secondary battery.

The invention claimed is:

1. An electrode for a secondary battery, comprising:
a current collector; and
an electrode active material layer that is formed on the current collector and contains an electrode active material, and
satisfying the following Relational Expressions 1 and 2

$7 \leq$ total surface area of active material particles per unit volume of electrode active material layer $\leq 10$  [Relational Expression 1]

$20 \leq$ total surface area of effective pores per unit volume of electrode active material layer $\leq 29$,  [Relational Expression 2]

and where in the above Relational Expression 1, the total surface area m²/cc of the active material particles per unit volume of the electrode active material layer is defined as total surface area per unit mass A m²/g of the active material particles in the electrode active material layer*a mixture density D g/cc of the electrode after rolling, and where in the above Relational Expression 2, the total surface area m²/ml of effective pores per unit volume of the electrode active material layer is defined as the total surface area per unit mass A m²/g of the active material particles in the electrode active material layer/effective pore volume $V_P$ ml/g in the electrode active material layer.

2. The electrode for a secondary battery of claim 1, wherein the total surface area per unit mass A of the active material particles in the electrode active material layer is 4 to 6 m²/g.

3. The electrode for a secondary battery of claim 1, wherein the mixture density D of the electrode after rolling is 1.6 to 1.8 g/cc.

4. The electrode for a secondary battery of claim 2, wherein the effective pore volume $V_P$ in the electrode active material layer is 0.15 to 0.25 ml/g.

5. The electrode for a secondary battery of claim 1, wherein the electrode for a secondary battery satisfies the following Relational Expressions 3 and 4

$7.3 \leq$ total surface area of active material particles per unit volume of electrode active material layer $\leq 9.5$; and  [Relational Expression 3]

$20.5 \leq$ total surface area of effective pores per unit volume of electrode active material layer $\leq 28.5$  [Relational Expression 4].

6. The electrode for a secondary battery of claim 1, wherein the electrode for a secondary batter satisfies at least two of the following Relational Expressions 5 to 7, $4.4 \leq A \leq 5.6$  [Relational Expression 5]

$0.18 \leq V_P \leq 0.21$  [Relational Expression 6]

$1.68 \leq D \leq 1.75$  [Relational Expression 7].

7. The electrode for a secondary battery of claim 1, wherein a ratio ((D90−D10)/D50) of a difference between a D90 particle diameter and a D10 particle diameter to a D50 particle diameter of the active material particles in the electrode active material layer is 1 or less.

8. The electrode for a secondary battery of claim 1, wherein an average size of the effective pores in the electrode active material layer is 10 μm or less.

9. The electrode for a secondary battery of claim 1, wherein the electrode is an anode.

10. The electrode for a secondary battery of claim 9, wherein the electrode active material includes a carbon-based active material.

11. A secondary battery comprising the electrode according to claim 1.

* * * * *